INVENTORS
VERNON R. HUGHES
ROBERT I. DIEFENDERFER JR.
BY M. Ralph Shaffer
THEIR ATTORNEY INVENTORS
VERNON R. HUGHES
ROBERT I. DIEFENDERFER JR.
BY M. Ralph Shaffer
THEIR ATTORNEY July 7, 1964 V. R. HUGHES ETAL 3,139,788

VISUAL REPRODUCTION SYSTEM OF MULTI-SELECTION CHARACTER

Filed May 16, 1962 3 Sheets-Sheet 3

INVENTORS
VERNON R. HUGHES
ROBERT I. DIEFENDERFER JR.
BY M. Ralph Shaffer
THEIR ATTORNEY United States Patent Office 3,139,788

Patented July 7, 1964

3,139,788 VISUAL REPRODUCTION SYSTEM OF MULTI-SELECTION CHARACTER

Vernon R. Hughes, Box 99, Jackson Hole, Wyo., and Robert I. Diefenderfer, Jr., Sheridan, Wyo.; said Diefenderfer assignor to said Hughes Filed May 16, 1962, Ser. No. 195,341
5 Claims. (Cl. 88—17)

The present invention relates to multi-selection systems wherein the character of a specific item selected may be reproduced in an automatic, sequential manner and, more particularly, to a new system and apparatus therefor which, for example, may be used to select any one of a number of moving picture films, with or without sound tracks, and to reproduce images therefrom during an automatically determined cycle.

Very familiar to the public is an item known as a "jukebox," generally found in restaurants and cafes, places of amusement and so forth. The jukebox is simply a device wherein one deposits a coin in the appropriate coin slot and pushes one or more buttons to select a particular disc recording to be played. Elaborate systems have been developed in the past wherein there are respective selector units for individual tables feeding into a general amplifier and reproduction unit which services the entire room. In other types of systems a small speaker is disposed at each unit (e.g. in each booth) and the patrons select the particular music they wish to hear by depressing the appropriate switching push buttons upon depositing a suitable coin. The push button system and coin operation techniques are well established and highly developed in the art.

That which the present invention supplies is a new and improved system, and apparatus therefor, for reproducing either in visual or audio-visual manner a selected one of a plurality of endless movie film cartridges. This is performed by slidably seating a plurality of endless film cartridges on a conveyor means and, by an appropriate hunting circuit suitably connected to the multi-switch means and suitable other structure, powering the conveyor so that a particular film may be selected and inserted or otherwise caused to engage the feed of an appropriate projector so the film may be run and enjoyed by the patrons. Thus, an endless film having a sound track may provide both audio and visual enjoyment of the film being reproduced.

Accordingly, an object of the present invention is to provide a reproduction system and apparatus therefor, wherein one of a plurality of moving picture films may be automatically selected and played in an automatic operating sequence.

A further object of the present invention is to provide a new and useful, audio-visual sound-tracked moving picture reproduction system wherein any one of a number of endless film cartridges may be automaticaly selected and played upon the depression or other actuation of appropriate selector switches which will generally be in the form of push button switches.

An additional object of the present invention is to provide a means by which endless film cartridges may be employed in the invention in such manner that the same may be conveyed from the endless belt thereof to direct engagement with the projector utilizing the same, such that the cartridge when played may be returned in a slidable mount manner back to the endless belt upon which it rides.

A further object is to provide a coin-operated push button machine adapted to play any one of a number of endless film cartridges so as to achieve either a visual or an audio-visual reproduction of the cartridge selected.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
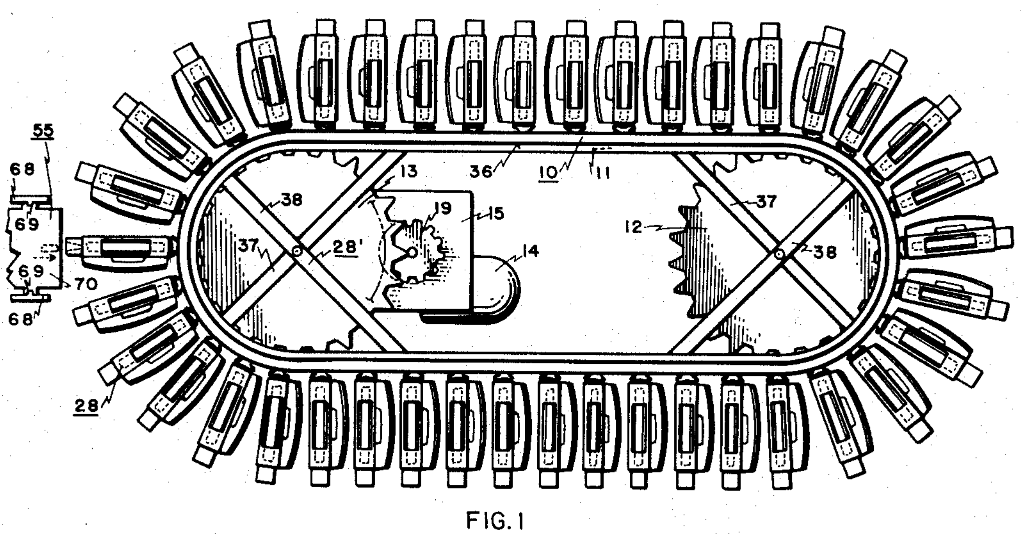
FIGURE 1 is a plan view of the conveyor, frame and drive structure associated with the present invention.
Figures 2, 3, 4:
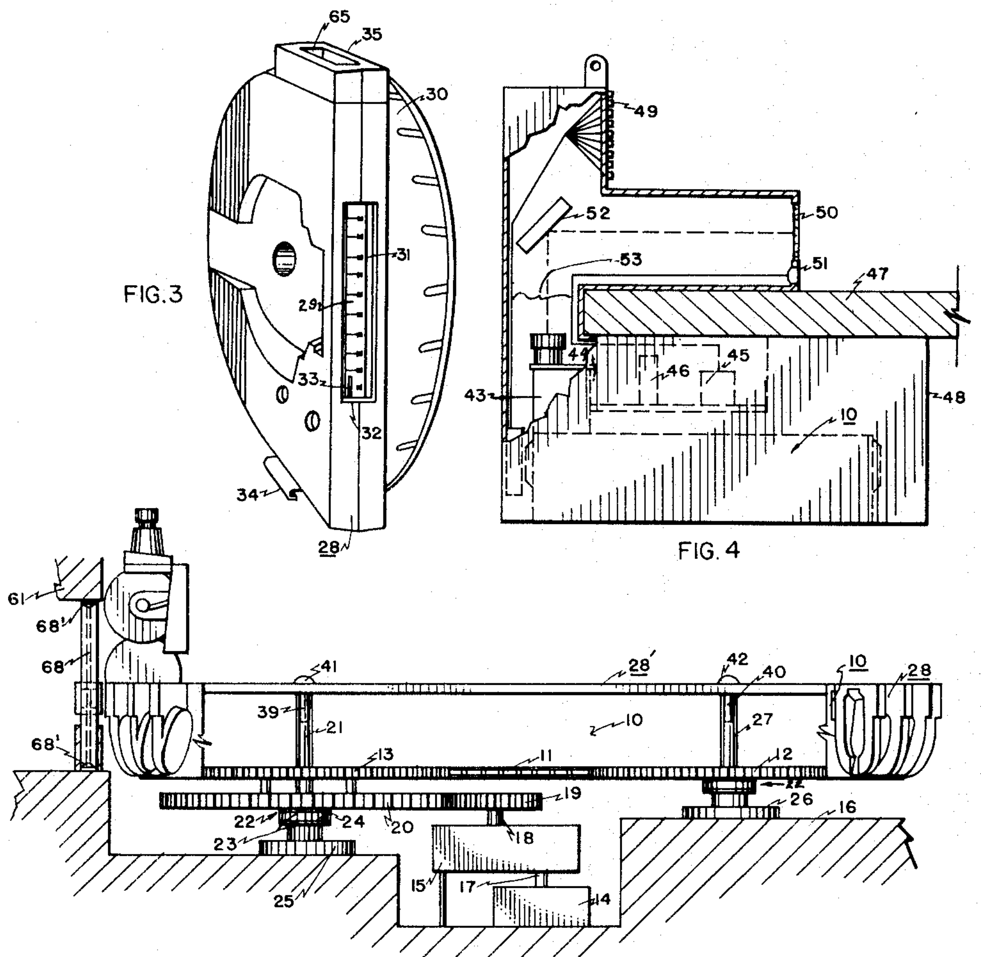
FIGURE 2 is a fragmentary side elevation partially in section of the structure in FIGURE 1, showing more in detail the drive mechanism associated therewith.
FIGURE 3 is a perspective view of a representative endless film cartridge which may be used in the practice of the present invention.
FIGURE 4 is a side elevation in diagrammatic view of the basic structure when the same is mounted to a support top such as a table or bar top.
Figure 5:
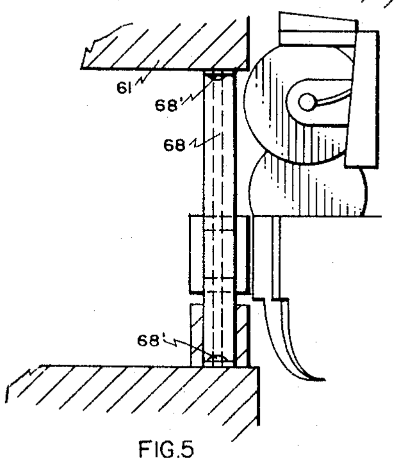
FIGURE 5 is an enlarged, fragmentary view of the carrier with its associated guide structure.

In the drawings, and see particularly FIGURES 1 and 2, the invention includes an endless conveyor means 10 which preferably takes the form of a conventional conveyor belt made, for example, of rubber and having a fabric web. Affixed to the lower inner margin of the conveyor means or belt 10 is an endless chain 11 which may resemble in configuration a bicycle chain engaging with idler sprocket 12 and drive sprocket 13. Drive motor 14 and gear box 15 are respectively secured to base 16 by conventional means, and the output shaft 17 of drive motor 14 is directly coupled into speed reduction gear box 15 to drive the output shaft 18 therefrom in reduced speed ratio so that pinion 19 may drive the final output gear 20. The gear 20 is affixed or otherwise made integral with sprocket 13 so as to drive the latter at a desired speed. As shown in FIGURE 2 the sprocket 13, with its accompanying gear 20, are freely mounted upon shaft 21 to revolve about thrust washer sandwich 22, the latter preferably comprising steel washers 23 which bear upon "Teflon" washer 24. The washer construction will be the same, preferably, for both the output gear 20 and also sprocket 12. Boss members 25 and 26 support upstandingly the respective shafts 21 and 27 upon and to the base 16. The upper inner margin of belt 10 is held erect by framework 28′ and an appropriate lubricant may be disposed between framework 28′ and belt 10 to reduce friction wear. As to driving the endless belt 10, the chain 11 supplied is preferably retained against the lower margin of endless belt 10 by means of thread, rivets, or other means. Again, the sprockets 13 and 12 are free to rotate on their respective shafts 21 and 27 so that the shafts 21 and 27 themselves need not move. Thus, drive motor 14 when energized drives output gear 20 through speed reduction gear box 15 so as to drive the belt 10, by virtue of the engagement of sprocket 13 with chain 11, at a desired speed.

The endless belt 10 carries a plurality of endless film cartridges 28 a representative one of which is illustrated in FIGURE 3. The cartridge 28 includes an endless loop of moving picture film 29, with or without a sound track included thereon, and a cartridge member 30 which contains the film. The film is driven at conventional sprocket apertures 31 when disposed in alignment with cartridge member slot 32. Preferably, as a sensing means to determine when the film has been run, a slot 33 will be disposed in the film to cooperate with a leaf switch means hereinafter to be mentioned.

Again, the endless cartridge (including the cartridge member and film) is strictly conventional, save for the inclusion of the added slot 33, and the slide member 34 and the engagement portion 35 integral with cartridge member 30. It will be observed with brief reference to FIGURE 7 that the belt 10 is supplied with a plurality of mounting members 36 which may be riveted, for example, to belt 10 in transverse, mutually spaced relationship about the belt. Each of the members 36 engages a slide member 34 of a respective one of the endless film cartridges 28. Members 36 are so designed that the cartridges will not drop out of engagement therewith, however, will be "open ended" or otherwise suitably configured at the top so as to permit the removal of cartridges and replacement thereof by new film cartridges. It is generally preferred that, even though the respective cartridges upon suitable selection will be withdrawn upwardly from their belt support, that the same will nonetheless remain in engagement with their respective slide support members 36 so that once the playing of the cartridge has been completed, as will hereinafter be described, the cartridge may be returned easily to its original position on the belt under force of gravity (or other forces) by simply sliding back and stopping in its original disposition along member 36.

FIGURES 1 and 2 show in detail the upper support structure for the endless belt 10. As shown, framework 28′ includes an elongated endless strap 36 which is braced by structure 37 and 38 at each of the respective extremities thereof. The framework 28′ is supported in a preferred embodiment of the invention by the attachment thereof to shafts 21 and 27 which optionally serve as mounting posts, receiving at drilled and tapped apertures 39 and 40 the mounting screws 41 and 42.

It is desirous that the endless belt can be disposed in a general horizontal plane, the belt sides being upstanding. See FIGURE 1. It will be be apparent that the endless film cartridges 28 will return to their seats along the belt structure simply under gravity so that all that is needed is a means to translate a selected film cartridge upwardly and into operative engagement with projector 43. Projector 43 may be a standard projector of any convenient type adapted to play endless film cartridges a representative one of which is illustrated in FIGURE 3. Such a projector which may be used is that going under the trade name "Technicolor Projector No. 800." Other types of projectors incorporating selectively insertable, endless film cartridges may likewise be used. Such a moving-picture projetcor will be supplied with a projecting bulb 44, an amplifier 45 to accommodate the sound track pickup of the projector, a motor and motor-driven fan 46, and other related equipment which will be of standard construction. It will be noted in FIGURE 4 that in a preferred embodiment of the invention a support top such as a table top or bar top 47 will be disposed transversely and medially with respect to case or housing 48, of generally upstanding construction. Thus, all of the major equipment may be disposed in a convenient place beneath top 47 and generally in out of the way disposition, whereas all that need be disposed above the table are the push button selector and standard memory unit 49 (if used), screen 50, permissably included speaker 51, and reflective means 52 generally taking the form of a mirror. Thus, the projector 43 will project its moving picture image sequence through passageway 53 (disposed between case 48 and top 47) so as to reflect the same from mirror 42 onto frosted glass screen 50. All that is necessary is that the screen 50 be in optical communication with the lens system of projector 43. It will be observed that rather than mirrors, an appropriate lens system might also be used. It will be noted in the structure of FIGURE 4 that the structure above the table top will be very inconspicuous and yet will be adequate for giving enjoyment to patrons.

Figure 6:
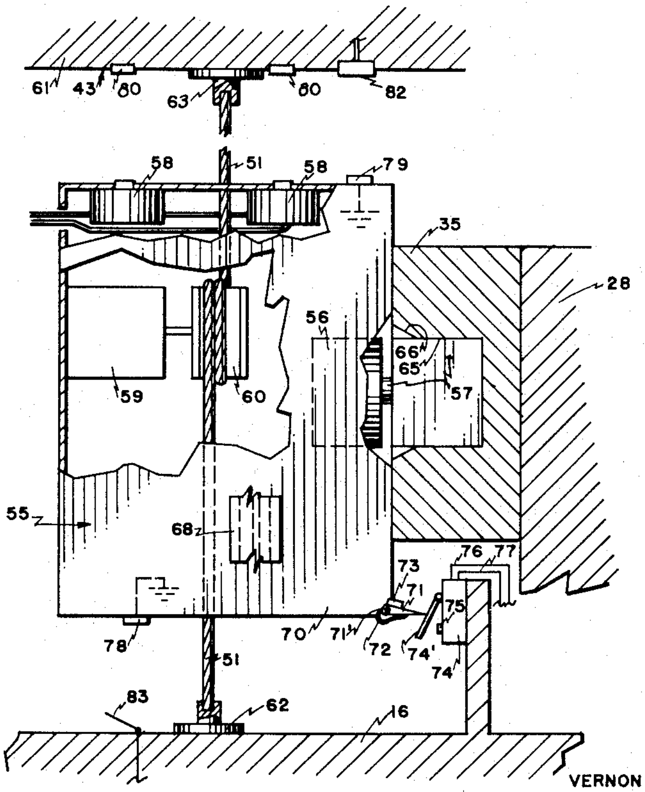
FIGURE 6 is an enlarged view in simplified form of the carrier of the present invention, illustrating its drive mechanism, solenoid means, and so forth.

Of importance is the means by which selected endless film cartridges are respectively transported for engagement with the projector 43 to be played thereby. Such a conveying or transporting structure is represented by carrier 55 as illustrated in FIGURES 1 and 6. While other means of endless film cartridge transport may be employed, it is deemed advisable to use the approach typified in the provision of the carrier member 55 which is shown. The same includes carrier-cartridge engagement solenoid 56 having plunger 57, one or pair of carrier attachment electromagnets 58, a motor 59 which is keyed to and drives a drum 60 the latter being provided with a taut endless cable 51 secured to base 16 and either the housing 61 of projector 43 or other suitable fixed structure. Motor 59 is appropriately energized at suitable times so as to drive the drum 60 which winds itself up the cable 51 to approach projector 43. When the motor 59 is deenergized, then, assuming electromagnets 58 are also deenergized, the unit may return back to base 60 under the force of gravity by the drum "unwinding" downwardly. It will be understood that the ends of the cable 51 will be fixed to their respective bosses 62 and 63 which are respectively mounted to base 16 and projector 43, for example. It will be noted that the cartridge 28 includes an engagement portion 35 (see also FIGURE 3) which is provided with a cavity 65 in the form of a regular depression which is tapered at 66. Plunger 57 is received in cavity 65 upon the actuation of solenoid 56 and, since the selected cartridge will be disposed directly against its mount with respect to belt 10, will be securely and positively engaged by plunger 57 so that, upon the energization of motor 59 the upward travel of carrier 55 will produce the upward sliding translation of the selected cartridge 28 which ultimately comes into engagement with the feed mechanism of projector 43. The carrier member 55 is constrained to rectilinear movement by virtue of guides 68 disposed upon opposite sides of carrier 55 and engaging slotted portions 69 of the housing 70 of carrier 55. The guides 68 will be secured at 68′ to the projector and base 16 or to other fixed structure as desired.

As a switching means, more fully hereinafter described, there may be provided a pivoted finger 71, pivotally secured at 71′ to housing 70 of carrier 55 and spring loaded by a small leaf spring 72. A stop 73 will be also provided so as to deter the counter-clockwise rotation of finger 71. Thus, during descent of carrier 55 the same will engage and thereby depress the leaf spring lever 74′ of micro-switch 74 so as to produce engagement of this switch through leaf 74′ and button 75 to the wire leads 76 and 77 thereof. Once finger 71 has passed the switch 74, then the same will be returned to its initial condition under pressure of spring 72 and will not actuate the leaf 74′ during ascent of carrier 55 since the spring 72 will be designed to be sufficiently light to permit such non-actuation. Thus, switch 74 is opened and closed upon respective descent of carrier 55 but is not actuated upon ascents thereof.

To complete the structure of carrier 55 there will be contact buttons 78 and 79 which are grounding contacts hereinafter to be explained. The projector 43 or other fixed structure will incorporate metallic plates 80 of magnetically responsive material for accommodating fixed securement with electromagnets 58 upon energization of the latter and contact therewith at the extremity of ascent of carrier 55. Electromagnets 58 are for retaining, for the time duration necessary, the carrier and selected cartridge (28) in operative engagement with projector 43 for the duration of film run.

A contact 62 will also be supplied and adapted for engagement with contact 79 of carrier 55. Correspondingly, a leaf contact 83 will be engageable with contact 78 of carrier 55 upon descent of the latter. All of these contacts will be described as to circuit operations hereinafter.

Figure 7:
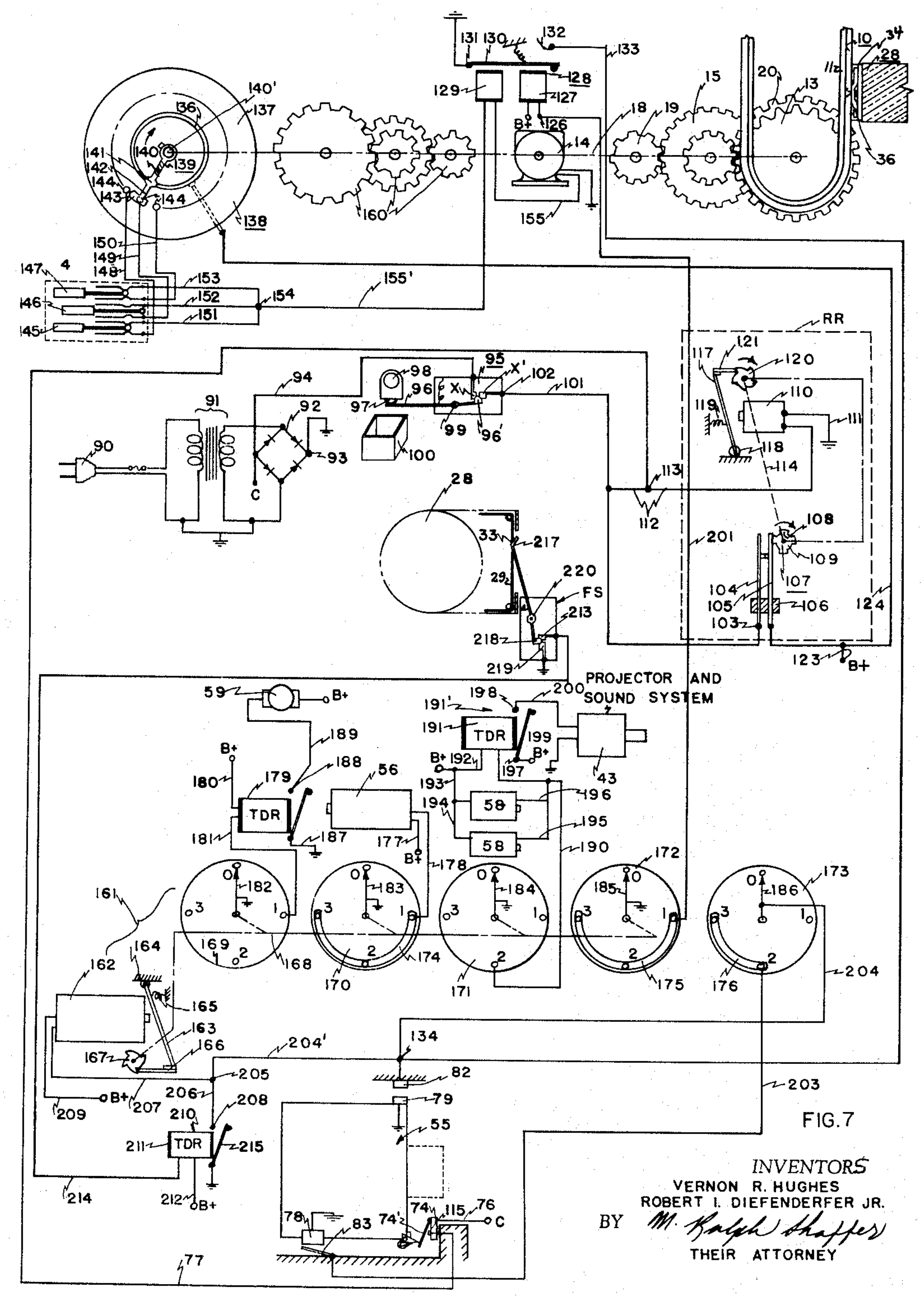
FIGURE 7 is an electrical schematic diagram of a basic electrical circuit which may be used in practicing the present invention.

FIGURE 7 is an electrical schematic diagram of a circuit which may be utilized in the present invention to provide a completed system. Input plug 90 is adapted for coupling to an electrical source and, for supplying direct current power, includes an intercoupling transformer 91 and a diode bridge 92 for supplying a D.C. voltage at terminal C. This will be referred hereinafter to as "C" voltage. One side of the bridge is maintained at a ground or common reference potential as at 93 and terminal C is coupled by lead 94 to normally opened switch 95. The contacts X and X' of switch 95 are shorted across by shorting bar 96' of leaf spring lever 96 when a coin 97 engages the same after being inserted in coin receiver 98. After rotating leaf lever 96 about its pivot 99 in a counter-clockwise direction, the coin 97 drops into coin collector box 100. Lead 101 connects to terminal 102 of which 95 and also to terminal 103 of leaf spring 104. Leaf spring 105 is of conductive material (as is also leaf spring 104) but is insulated from the former by means of their mutual mounting block 106. Cog wheel 107 is preferably made of insulative material and, by virtue of its fingers 108 and depressions 109, causes an on-off circuit connection between leaves 104 and 105 on the receipt of sequential electrical impulses by electromagnets 110. One side of electromagnet 110 is grounded at 111 whereas the remaining side is coupled by lead 112 to switch terminal 102 and, at junction 113, is connected by lead 77 to switch terminal 115 of switch 74.

Arm 117 is pivoted at 118 and spring tensioned at 119 so that, upon the energization of electromagnet 110 the arm 117 will come into engagement with ratchet wheel 120 by finger 121 so as to rotate ratchet wheel 120 and hence, cog wheel 107. Ratchet wheel 120 and cog wheel 107 are ganged together as by mounting to a common shaft 114.

When a coin is inserted at receiver 98, a short pulse of electrical energy is transmitted through switch 95 and lead 101 to electromagnet 110, thereby causing the rotation of cog wheel 107 to the position shown in FIGURE 7 so that B+ voltage appears at 105. (Terminal 123 shall be referred to as the B+ terminal; where B+ is symbolized, the same will designate a connection to the B+ terminal 123.) Lead 201 is connected between contact #1 of switch disc 172 and terminal 126 of first winding 127 of relay 128 which is normally closed. Relay 128 has a second and independent winding 129 for pulling down upon armature 130 of the relay. Relay terminal 131 is grounded, is connected to armature 130, and the relay contact 132 is connected through lead 133 to juncture 134.

Lead 124 connects from leaf 105 to B+ terminal 123 and to conductive ring 136 which is disposed in planar relationship upon insulative disc 137 of rotary switch, hunting circuit unit 138. Unit 138 also includes a rotatable arm 139 which has an insulative portion 140 and conductive portions 141 (a wiper of ring 136), 142 and 143 which are electrically inter-conductive. Portion 143 represents an arm extremity which simultaneously contacts two (only) adjacent rotary switch contacts 144 as the arm progresses in a clockwise direction. Each of the respective contacts 144 is respectively connected to push button switches 145, 146, and 147, as shown, by leads 148, 149, and 150, respectively. The remaining leads 151, 152, and 153 are common to each other at junction 154 and are connected therefrom by leads 155' and 155 to one terminal of motor 14, this through series connected relay winding 129. Again, this motor 14 is the drive source for driving the chain 11 in FIGURE 1.

Switches 145, 146, and 147 are identical switches and are merely representative switches of a large selector switch board as illustrated at 49. These switches will correspond in number to the number of contacts 144 and endless-film cartridges 28 which can be employed in the system, and are normally closed, with selective depression thereof (as illustrated by switch 146) accomplishing a disengagement of leads 49 and 52, by way of example. While many types of selector switches may be employed, the circuit is simplified by employing switches similar to those shown in FIGURE 7.

Once depression has been accomplished, there are on the market a number of mechanisms for returning the depressed push button to its initial condition, either before or after a playing cycle has been completed. Also, a coin reject circuit may be incorporated and a suitable memory circuit provided, all of which is strictly conventional in the highly developed art of jukebox systems. What is important in this particular area of the present invention is that upon the depression of push button 146, an open circuit condition will occur in the line including lead 152 so that B+ voltage will not be supplied the motor 14 once contact arm 140 arrives at the contact 144 associated with switch 146. This condition stops motor 14. FIGURE 7 illustrates that appropriate gear reduction means 160 will be disposed between the drive motor 14 and the shaft 140', which is keyed to arm 139, so that the arm 139 will sweep 360° upon 360° revolvement of track 11. This is accomplished by gearing 160.

Five-gang stepping relay 161 includes a solenoid electromagnet 162 having conventional arm 163 pivoted at 164 and spring biased at 165. The finger 166 of arm 163 engages ratchet wheel 167 which, in the embodiment shown, has four teeth. The rotatable gangs are keyed as by a common shaft 168 to ratchet wheel 167 and include discs 169, 170, 171, 172 and 173, all of general conventional design. Contacts 1, 2, 3 and 4 are supplied the respective discs 169–173, and some of these contacts are mutually inter-engaged by electrically conductive metallic bands 174, 175 and 176 in the case of discs 170, 172 and 173.

(While the term "contact" has been used with reference to indicated terminals #1, 2, 3 and 4 of the gang discs 169-173, it will be understood that the tie strips 174, 175 and 176 which are engaged by their arms 183, 185 and 186 may themselves serve as these "contacts.")

Lead 177 connects the B+ terminal to cartridge carrier solenoil 56. Lead 178 is connected between the solenoid 56 and contact 1 of disc 170 (which contact 1 may be an integral portion of and planar with strip 174). Time delay relay 179 is coupled to the B+ terminal by means of lead 180, and lead 181 leads from the remaining terminal thereof to contact #1 of disc 169. Arms 182–186 are all rotatable about the common shaft 168. Arm 186 is simply a simplified, circuit-closing device and is distinguished from the remaining arms in that it is not grounded other than through the overall circuit. Lead 187 connects to one contact of the time delay relay 179 and, as shown, is maintained at ground potential. Time delay relay 179 is normally open and includes contact 188 which is connected to the carrier motor 59 by lead 189. The remaining terminal of the carrier motor is maintained at B+ potential by appropriate connection to the B+ terminal.

Terminal or contact #2 of disc 171 is connected by lead 190 to the core winding of time delay relay 191, and the remaining terminal thereof is maintained at B+ potential as shown by lead 192. At this juncture it is shown that leads 193 and 194 connect to the B+ terminal shown and lead to the carrier-projector electromagnets 58. The remaining terminals of the electromagnets are connected by leads 195 and 196 to lead 190 and, hence, shunt across the core of time delay relay 191. Rely 191 includes swiching contacts 197 and 198 which lead by respective electrical leads 199 and 200 to the projection and sound system as 43 and connecting the same to and across the B+ supply. (See FIGURE 4.)

Contact 2 of disc 173 is connected by lead 203 to the switch arm 83. Lead 204 is connected between arm 186 of disc 173 and junction 134. Lead 204 interconnects junction 134 with junction 205 to the latter of which is connected leads 206 and 207 which respectively lead to switch contact 208 and to the electromagnet 162. Electrical lead 209 interconnects the remaining side of electromagnet 162 to the B+ terminal as shown. Relay 210 is a time delay relay having its core winding 211 connected to the B+ terminal by lead 212 and to switch contact 213 by lead 214. Relay arm 215 is maintained at ground potential, as shown, and relay 210 is in normally-open condition. Configured leaf 217 includes a shorting bar 218 which shorts contacts 213 and 219 together upon the moving picture film arriving at this point at the slot 33. Leaf 217 is pivoted at 220.

The circuit illustrated in FIGURE 7 operates as follows. As has been before described, the rotary switch hunting unit 138 is driven by motor 14 and is keyed to the track drive sprocket so as to be in one-to-one relationship with the latter. The time delay relays 210, 191′, and 179 employed are of the type such that there is a time delay before the relay energizes. This can be done by designing the core appropriately, and such is standard practice. An electrical pulse received by electromagnet 110 will produce a closing of members 104 and 105. Members 104 and 105 are disconnected upon the receipt by electromagnet 110 of a subsequent electrical pulse. As to the five-gang stepping relay 161, the electromagnet 162 is actuated upon the receipt of successive pulses of electrical current. Successive electrical pulses received by electromagnet 162 will rotate switch arms 182, 183, 184, 185 and 186 equally, so that upon receipt of a first pulse the arms will advance from contact 0 to contact 1, upon receiving a second pulse the arms will advance from contact 1 to contact 2, and so forth. It is to be noted that this is in contrast with the operation of the electromagnet 110 wherein circuit closure is accomplished only upon receipt of every other electrical impulse.

Thus, the circuit of the system will operate as follows. Upon insertion of a coin 97 into coin receiver 98 there will be a closing of a switch 95 so as to produce a closing of circuit elements 104 and 105, thereby providing B+ voltage at B+ terminal 123. If the arm 139 of hunting unit 138 is "off-null" then, the motor 14 is driven through unit 138 and the push button unit 49; thus, arm 139 will rotatingly advance about 137 in accordance with the rotation of shaft 140′ until it "finds" the contact 144 directly connected to depressed switch button 146. This particular contact 144 will be a dead or open contact so that the motor 14 will stop and the arm 139 cease its rotation. It will be noted that the core winding 129 of relay 128 is in electrical series relationship with common terminal 154 so that the normally-closed secondary circuit of the relay through terminals 131 and 132 will be closed. This applies ground to junction terminal 134 which causes the energization of electromagnet 162 and the stepping from position 0 to position 1 of the five-gang stepping relay, i.e. the advancement from "0" to "1" of all arms 182–186. This in turn produces the energization of the carrier motor 59 through time delay relay 179 which is timed for closure a few milli-seconds after the energization of the cartridge carrier solenoid 56 which also takes place at this time.

It will be noted that relay core winding 127 constitutes a recoupement circuit in picking up B+ and ground therethrough, by virtue of disc 172, so as to open the contacts 131, 132. Hence, the ground is subsequently removed from lead 133 so that electromagnet 162 is de-energized, thereby permitting arm 163 to spring backwardly for subsequent actuation of ratchet wheel 167 upon the subsequent energization of electromagnet 162.

Thus, the energization of solenoid 56 produces the outward thrust necessary to engage the carrier 56 with the selected endless film cartridge 28. It is noted that the carrier motor is energized so as to produce the upper travel of carrier 55 upon cable 51 only after the energization of solenoid 56 has taken place and has assured the fixed retentive engagement of carrier 55 with the selected endless film cartridge 28.

The carrier motor 59 revolves drum 60 so as to wind the carrier up the cable 51 sufficiently that the film loaded in cartridge 58 comes in contact with the feed mechanism (not shown) of the projector; at this time electromagnets 58 will engage ferrous plates 80 and the former energized so that the carrier 55 will be in fixed retentive engagement with the projector 43 or other fixed structure. This is accomplished by virtue of the fact that the contact 79 supplies a ground to contact 82, and the latter is directly connected to junction terminal 134 so as to supply the ground to electromagnet 162 and thus rotate all of the arms 182, 183, 184, 185, and 186 a quarter turn to position #2.

Arm arrival at position #2 turns off the carrier motor 59, supplies B+ voltage to switch arm 83, energizes the carrier-projector electromagnets 58 and, after an appropriate time delay exhibited by relay 191′, starts the conventional electrical and sound systems of the projector apparatus 43 through relay 191′. Thus, the picture and optionally included sound will be reproduced until the film has traversed its entire run, at which time leaf 217 will engage slot 33 of the film so as to produce a momentary electrical conduction through the switch FS (composed of elements 213, 218, and 219) and thereby energize time delay relay 210. A time delay relay is used here so that the film proceed somewhat past the engagement of the slot point thereof with leaf 217. Thus, leaf 217 will come back to normal engaged position with the film, thereby rendering the film switch FS open and remove the constant grounding connection to relay 210. The time delayed pulse, however arrives at electromagnet 162 which, upon energization thereby, serves to rotate all of the arms 182, 183, 184, 185 and 186 to position 3, thereby shutting off the projector and sound system, de-energizing the electromagnets 58, and permitting the carrier 55 and its selected film cartridge 28 to fall under the force of gravity (as somewhat counter-balanced by motor and drum inertia and drum-cable friction exhibited by carrier 55) to their initial position. This descent engages contacts 78 and 83 so that a ground is supplied through arm 186 to junction terminal 134, thus switching the five gang stepping relay to position 0 and, thereby, de-energizing the cartridge carrier solenoid 56 causing the same to release its engagement with the selected cartridge. Further, and subsequently, an intermittent electrical pulse is transmitted through switch 74 to advance ratchet relay RR to electrical "off" condition. The electrical circuit is thus ready for receiving the depression of another selected push button to repeat the operating cycle with a newly selected film cartridge.

Throughout the general description, objects, detailed description, specification and claims hereof, the terms "endless film" and "film" shall be understood to refer not only to conventional, celluloid moving picture film, but also to video image conditioned magnetic tape or similar "films" which are fed, instead of into conventional moving picture projectors as in the case of the former, into video-reproducing television projection devices presently in existence the operations of which are well known. Endless film cartridges or cartridge members presently in existence are adapted to receive either celluloid, endless moving picture films, or endless, magnetic or other video tapes.

Similarly, the terms "movie projector," "moving picture projector," and "projector" refer not only to those fed by celluloid films but also to those video-reproducing television projector devices which project video images either on a self-contained screen or on a separate screen as in a "projection television" system the operation of which is well known.

Further, it will be understood that the push button unit 49 controlling the system may be disposed either proximate or remote the projector 43 employed, and that many push button units 49 may be disposed in tandem by conventional circuiting, as is conventional on present-day jukebox systems, and thus be adapted to control the system from any one of several locations.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A reproduction system of multi-selection character, said system including, in combination, a moving picture projector of the endless-film cartridge receiving type; endless loop conveyor means; plural, mutually spaced, endless-film cartridges, transversely oriented with respect to said conveyor means and slideably mounted upon said conveyor means for selective transverse movement with respect thereto; coin-operated electro-mechanical means, including multiple switch selector means and motor drive means, for driving said conveyor means to position a selected one of said cartridges adjacent said projector for operative engagement therewith in accordance with the selected electrical condition of said multiple switch selector means; means for thereupon automatically slideably translating the selected cartridge transversely with respect to said conveyor means and for operatively engaging the same with said projector; means for automatically actuating said projector to reproduce a moving picture image from the cartridge selected once the same is in operative engagement with said projector; screen means disposed in optical communication with said projector to receive and to visually reproduce said motion picture image; means for automatically stopping said projector once the said motion picture image reproduction is completed; and means for thereupon returning said selected cartridge to its initial position with respect to said conveyor means to complete the cartridge selection cycle selected by said multiple switch selector means preparatory to subsequent selective actuation of the latter.

2. A reproduction system of multi-selection character, said system including, in combination, a moving picture projector of the endless-film cartridge receiving type; endless loop conveyor means; plural, mutually spaced, endless-film cartridges, transversely oriented with respect to said conveyor means and slideably mounted upon said conveyor means for selective transverse movement with respect thereto; electro-mechanical means, including multiple switch selector means and motor drive means, for driving said conveyor means to position a selected one of said cartridges adjacent said projector for operative engagement therewith in accordance with the selected electrical condition of said multiple switch selector means; means for thereupon automatically slideably translating the selected cartridge transversely with respect to said conveyor means and for operatively engaging the same with said projector; means for automatically actuating said projector to reproduce a moving picture image from the cartridge selected once the same is in operative engagement with said projector; screen means disposed in optical communication with said projector to receive and to visually reproduce said motion picture image; means for automatically stopping said projector once the said motion picture image reproduction is completed; and means for thereupon returning said selected cartridge to its initial position with respect to said conveyor means to complete the cartridge selection cycle selected by said multiple switch selector means preparatory to subsequent selective actuation of the latter.

3. A reproduction system according to claim 2 wherein said conveyor means comprises an endless belt having plural, slide mount structures transversely disposed in mutually spaced relationship along and secured to said endless belt, said endless-film cartridges being respectively and slideably secured to respective ones of said slide mount structures for slideable movement beyond remaining ones of said cartridges and engagement with said projector, said slide mount structures and cartridges being so constructed and arranged that mutual inter-engagement thereof is retained throughout operative cartridge selection, said conveyor means also including means for revolvingly retaining said endless belt in taut, open condition.

4. A reproduction system according to claim 3 wherein said translating means includes a carrier means engageable with said selected endless-film cartridge for transporting the same to its engaged position with respect to said projector and for enabling the withdrawal of the selected cartridge from said projector when the same has been run.

5. A reproduction system of multi-selection character, said system including, in combination, a moving picture projector of the endless-film cartridge receiving type; conveyor means; plural, endless-film cartridges carried by said conveyor means; electro-mechanical means, including multiple switch selector means, for driving said conveyor means to position a selected one of said cartridges adjacent said projector for operative engagement therewith in accordance with the selected electrical condition of said multiple switch selector means; means for thereupon automatically translating the selected cartridge and for operatively engaging the same with said projector; means for automatically actuating said projector to reproduce a moving picture image from the cartridge selected once the same is in operative engagement with said projector; screen means disposed in optical communication with said projector to receive and to visually reproduce said motion picture image; means for automatically stopping said projector once the said motion picture image reproduction is completed; mirror means for reflectively communicating images from said projector to said screen, said screen thereby being adapted for desired positioning; an upstanding housing encasing the above enumerated structure; a support top transversely and medially disposed with respect to said housing, said housing and support top being so constructed and arranged as to provide a light projection passageway therebetween, said mirror means being disposed within said housing above said support top for directing light from said projector to said screen, said multiple switch selector means and screen means with said mirror means being disposed above said support top, the remainder of the above mentioned equipment being disposed beneath said support top.

References Cited in the file of this patent

UNITED STATES PATENTS

| | | |
|---|---|---|
| 2,214,468 | Lannerd | Sept. 10, 1940 |
| 2,256,739 | Graves | Sept. 23, 1941 |
| 2,568,734 | Heyer | Sept. 25, 1957 |
| 3,091,992 | Bertoni | June 4, 1963 |